United States Patent [19]
Yamanaka et al.

[11] Patent Number: 5,892,604
[45] Date of Patent: Apr. 6, 1999

[54] ATM SWITCH

[75] Inventors: Naoaki Yamanaka, Tokyo; Kohei Shiomoto, Saitama; Eiji Oki; Seisho Yasukawa, both of Tokyo, all of Japan

[73] Assignee: Nippon Telegraph and Telephone Corporation, Tokyo, Japan

[21] Appl. No.: 852,396

[22] Filed: May 7, 1997

[30] Foreign Application Priority Data

| May 9, 1996 | [JP] | Japan | 8-115001 |
| Aug. 22, 1996 | [JP] | Japan | 8-221445 |
| Sep. 25, 1996 | [JP] | Japan | 8-253303 |
| Dec. 10, 1996 | [JP] | Japan | 8-329629 |

[51] Int. Cl.$^6$ ................................................ H04J 14/02
[52] U.S. Cl. ........................ 359/128; 359/117; 370/395
[58] Field of Search ............................... 359/117, 123, 359/128, 137; 370/395

[56] References Cited

U.S. PATENT DOCUMENTS

| 5,303,078 | 4/1994 | Brackett et al. | 359/139 |
| 5,475,679 | 12/1995 | Munter | 359/117 |
| 5,506,714 | 4/1996 | Nishio | 359/139 |
| 5,604,734 | 2/1997 | Buhrgard | 359/117 |

OTHER PUBLICATIONS

"Polarization-insensitive arrayed-waveguide grating wavelength multiplexer on silicon", by H. Takahashi et al., Optics Letters, vol. 17, No. 7, Apr. 1, 1992, pp. 499–501.

"Nonblocking Networks for Fast Packet Switching", by R. Melen et al., IEEE, 1989, pp. 548–557.

"A High-Speed ATM Switch with Input and Cross-Point Buffers", by Y. Doi et al., IEICE Trans, Commun, vol. E76–8, No. 3, Mar. 1993, pp. 310–314.

*Primary Examiner*—Kinfe-Michael Negash
*Attorney, Agent, or Firm*—Blakely Sokoloff Taylor & Zafman

[57] ABSTRACT

An ATM switch includes a plurality of input line corresponding units, a plurality of output line corresponding units, and a wavelength shifting unit. The wavelength shifting unit is arranged between the input line corresponding units and the output line corresponding units to shift optical signals having different wavelengths in a plurality of wavelength-multiplexed optical signals arriving from the input line corresponding units and output the wavelength-multiplexed optical signals. Each input line corresponding unit includes an input-side basic switch for distributing N (N is a positive integer) cells respectively input to input ports to N lines, an electro-optic converter for converting the cells into optical signals having different wavelengths in units of N lines, and a multiplexer for multiplexing the optical signals into one wavelength-multiplexed optical signal. Each output line corresponding unit includes a demultiplexer for demultiplexing the wavelength-multiplexed optical signal in units of wavelengths, an opto-electric converter for converting outputs from the demultiplexer into electrical signals, respectively, and an output-side basic switch for distributing the cells converted into the electrical signals to a plurality of output ports.

9 Claims, 18 Drawing Sheets

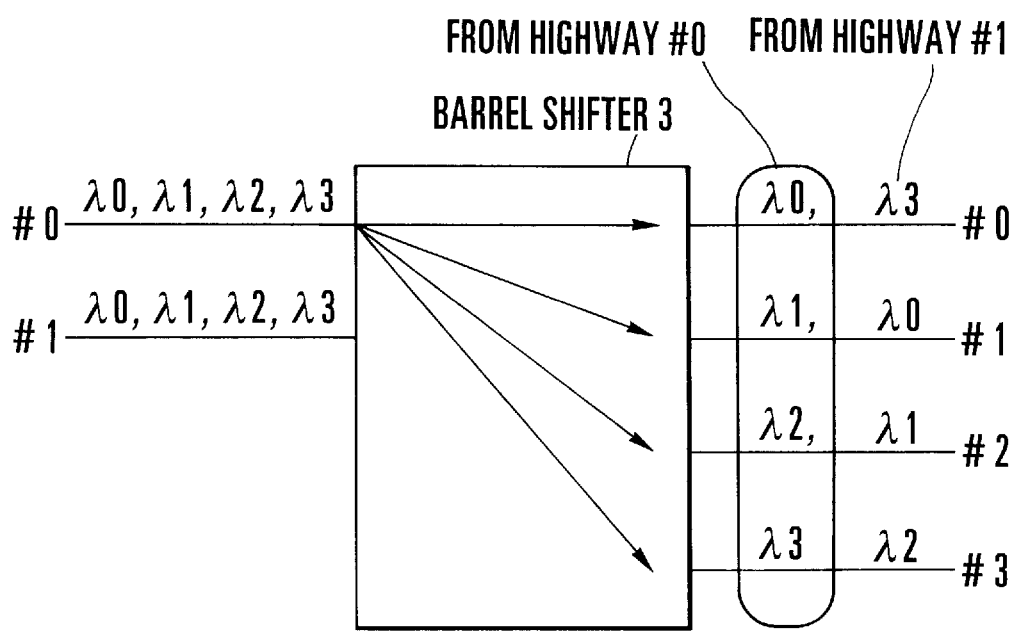
F I G. 2

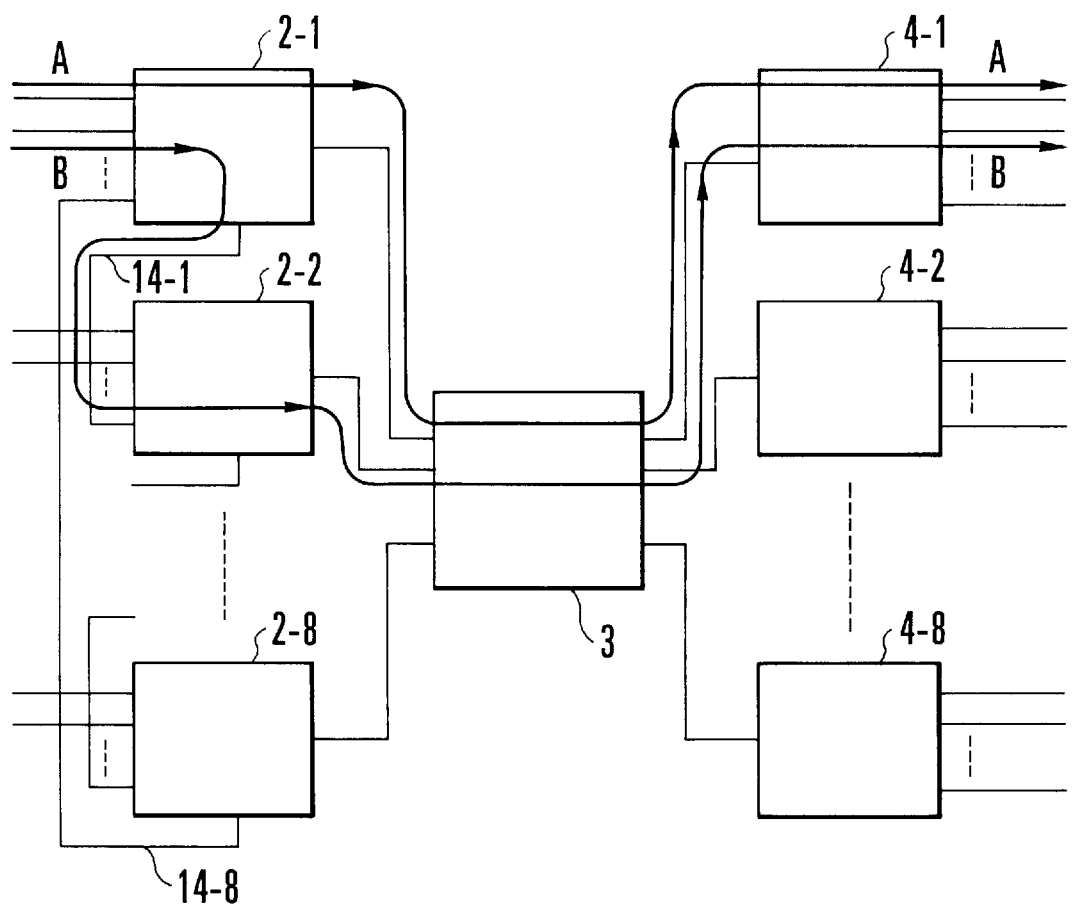
F I G. 8

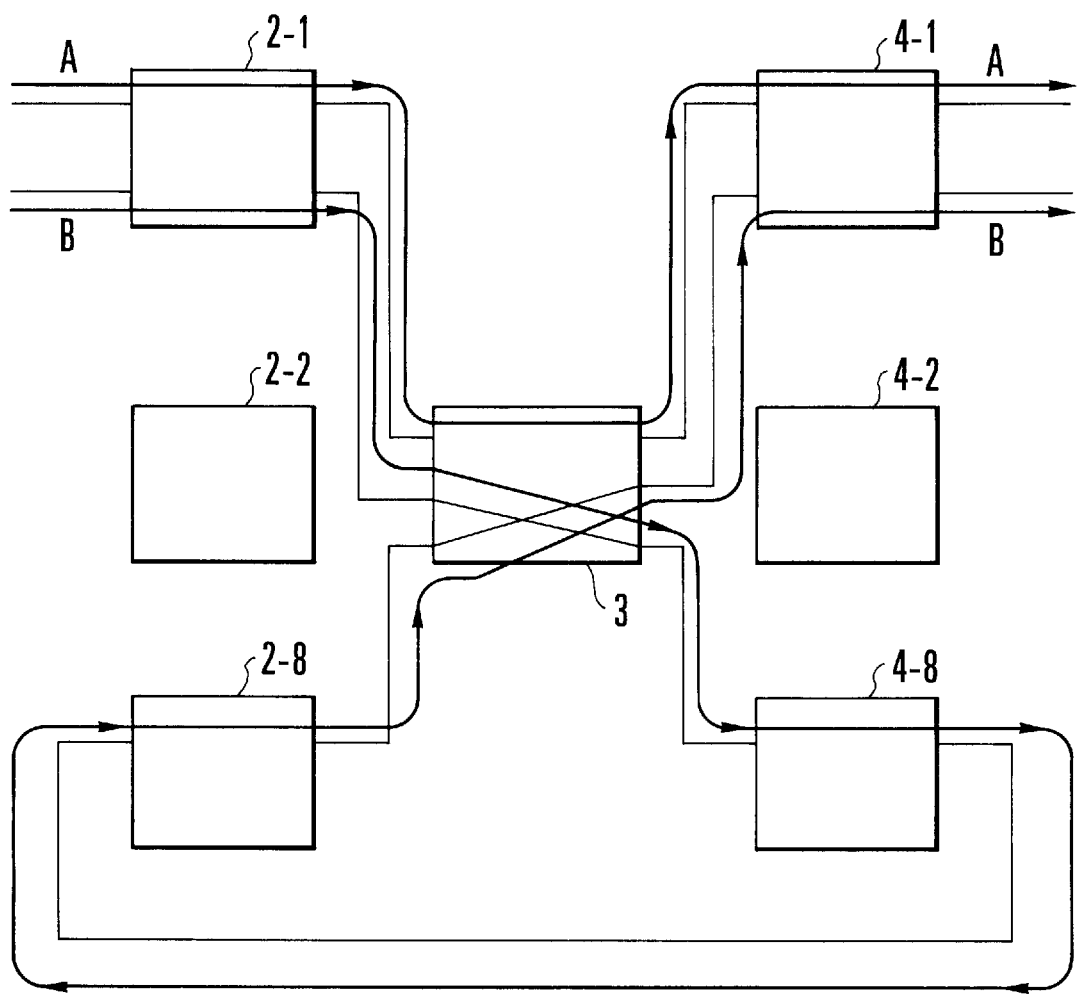
F I G. 10

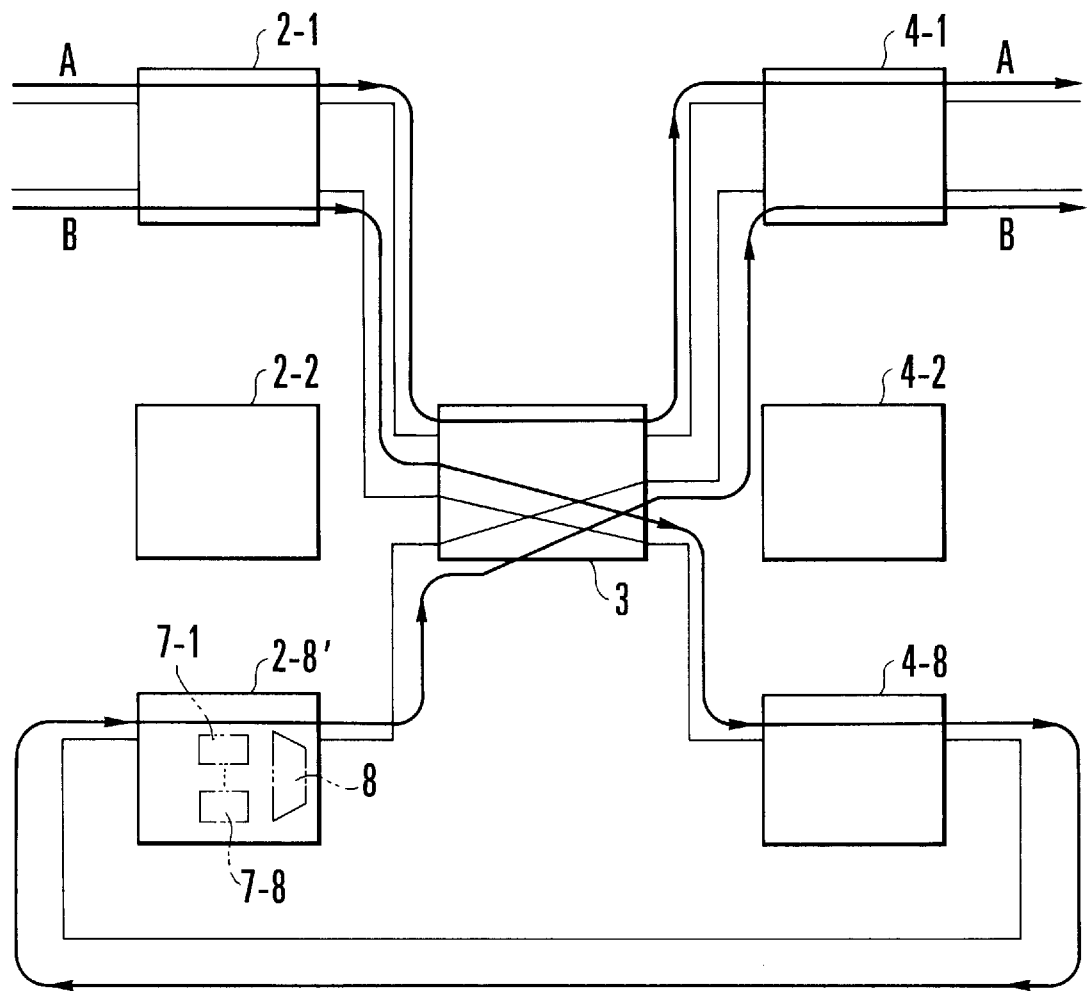
F I G. 12

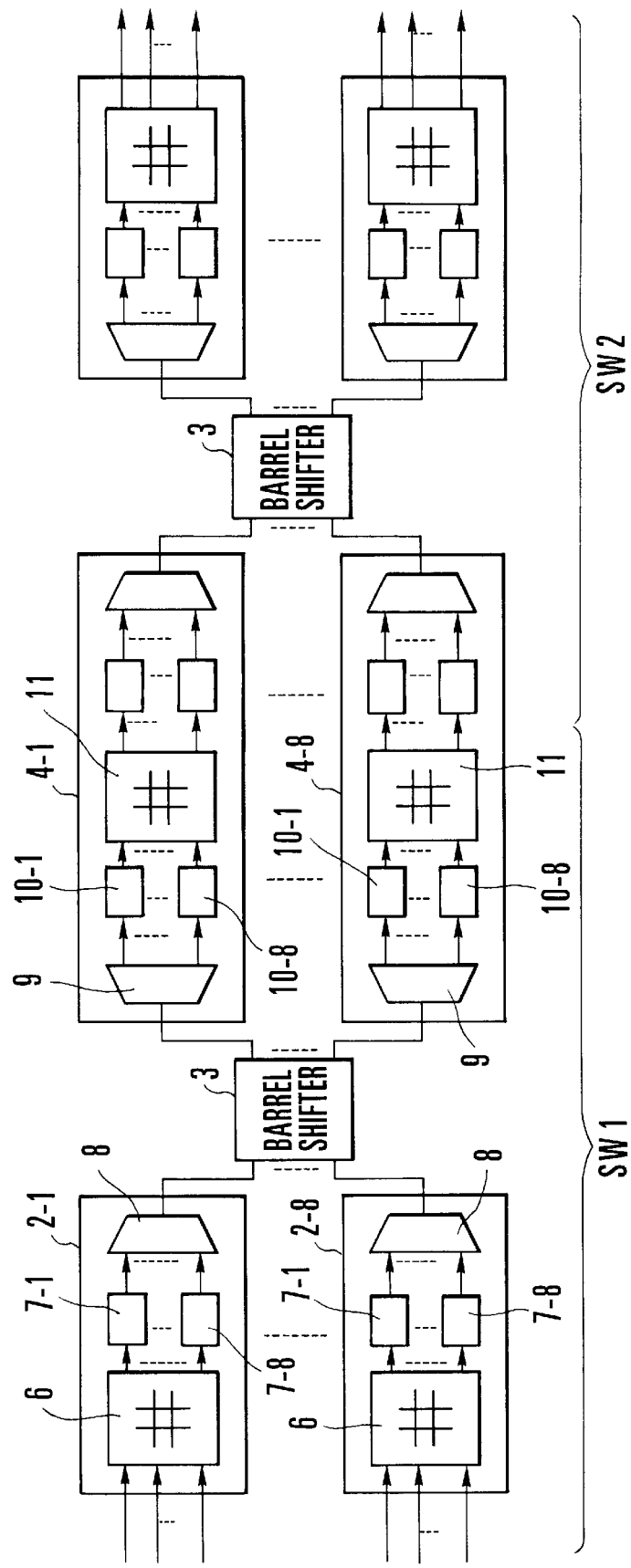
F I G. 15

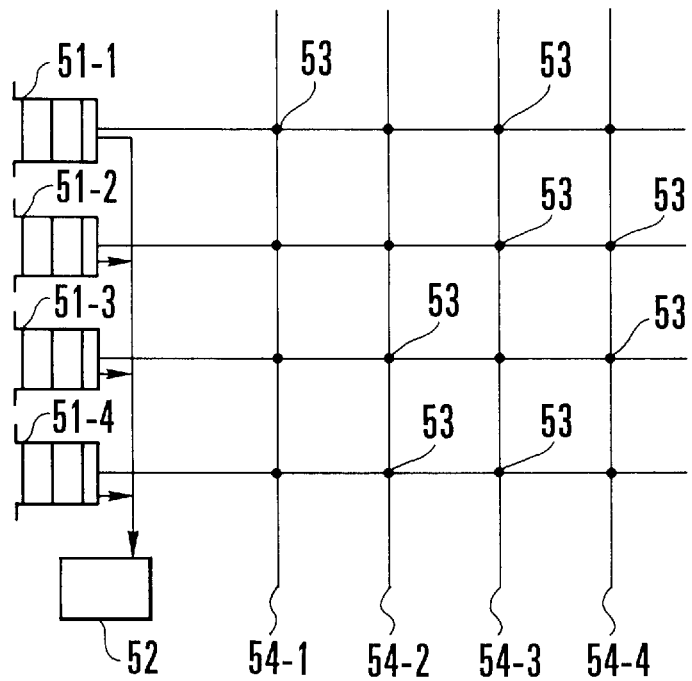
F I G. 16
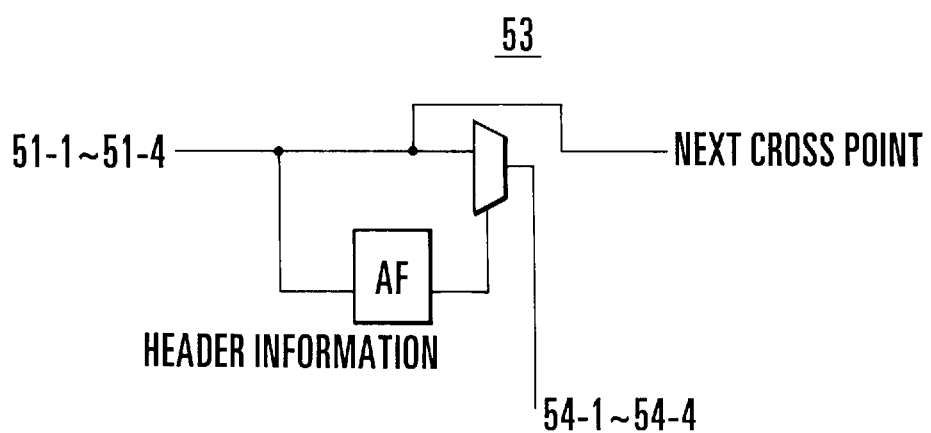
F I G. 17

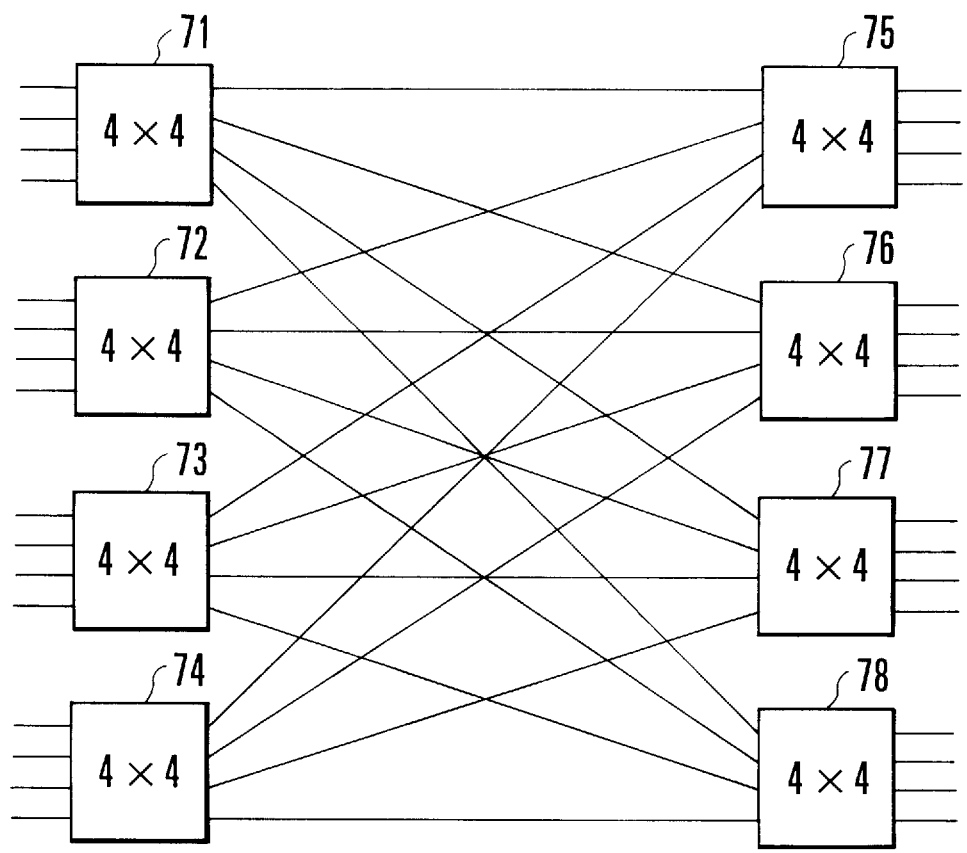
F I G. 18

ATM SWITCH

BACKGROUND OF THE INVENTION

The present invention is used for ATM (Asynchronous Transfer Mode) communication. The present invention relates to a technique of simplifying connection of the internal links of an ATM switch. The present invention also relates to a technique of constituting an ATM switch using an optical device. The present invention also relates to a technique of coping with traffic localization.

FIGS. 16 to 18 explain a conventional ATM switch. FIG. 16 shows the arrangement of a 4×4 (m inputs and n outputs are represented by "m×n") basic switch. FIG. 17 shows the detailed arrangement of a cross point in the basic switch. FIG. 18 shows the arrangement of a 16×16 ATM switch using eight 4×4 basic switches. The ATM switch is described in detail in reference "Illustrated standard ATM textbook, ASCII Shuppansha".

The arrangement of the basic switch will be described with reference to FIGS. 16 and 17. An input buffer type basic switch will be described below. This basic switch comprises input buffers 51-1 to 51-4 for temporarily storing arriving cells, a controller 52 for controlling the congestion of cells, cross points 53 for transferring ATM cells output from the input buffers 51-1 to 51-4 to desired output ports, and output highways 54-1 to 54-4 to which ATM cells are transferred. The controller 52 communicates with the respective input buffers 51-1 to 51-4 to permit cell transmission so as not to transfer the cells from the input buffers 51-1 to 51-4 to the same one of the output highways 54-1 to 54-4. The cross point 53 has an address filter AF, as shown in FIG. 17, and transfers an input cell to the corresponding one of the output highways 54-1 to 54-4 on the basis of the information in the header of the cell.

The conventional ATM switch is constituted using a plurality of basic switches shown in FIGS. 16 and 17. FIG. 18 shows a 16×16 ATM switch constituted using eight 4×4 basic switches 71 to 78. The basic switches 71 to 74 are individually connected to the basic switches 75 to 78 through links so that a cell from an arbitrary input line can be output to an arbitrary output line.

When the ATM switch is to be constituted using a plurality of basic switches, a number of links are required to mutually connect the respective basic switches. In addition, wires for connection are intertwined with each other to result in a complex structure. In the example shown in FIG. 18, 16 links are necessary. An actual large-scale ATM switch uses several ten or several hundred basic switches, and the number of links therebetween is enormous.

The links are constituted using optical fibers. The process of connecting the wires requires a long time. In addition, the check process for preventing erroneous interconnection increases the apparatus cost and the work time. Every time the number of basic switches is increased/decreased, interconnections between the wires must be changed for all the basic switches, so the degree of freedom in increasing/decreasing the number of basic switches is low.

When the traffics localize in routes from the basic switch 71 to the basic switch 75 and from the basic switch 72 to the basic switch 76, the links connecting these switches congest. This situation is shown in FIG. 19. FIG. 19 shows the congestion situation of the 16×16 ATM switch. This largely degrades the throughput of the switch.

SUMMARY OF THE INVENTION

It is the principal object of the present invention to provide an ATM switch capable of flexibly coping with an increase/decrease in the number of input/output lines.

It is another object of the present invention to provide an ATM switch capable of solving the conventional complex link connection to reduce the quantity of hardware.

It is still another object of the present invention to provide an ATM switch capable of solving traffic localization generated in the respective lines.

It is still another object of the present invention to provide an ATM switch applicable to a large-scale ATM switch structure.

In order to achieve the above objects of the present invention, there is provided an ATM switch for distributing cells arriving from a plurality of input lines to a plurality of output lines, comprising a plurality of input line corresponding units each connected to the plurality of input lines, a plurality of output line corresponding units each connected to the plurality of output lines, and wavelength shifting means, arranged between the input line corresponding units and the output line corresponding units, for shifting optical signals having different wavelengths included in a plurality of wavelength-multiplexed optical signals arriving from the input line corresponding units and outputting the wavelength-multiplexed optical signals, wherein each of the input line corresponding units includes an input-side basic switch for distributing N (N is a positive integer) cells which are respectively input to a plurality of input ports to N lines, electro-optic conversion means for converting the cells distributed to the N lines into optical signals having different wavelengths in units of lines, and a multiplexer for multiplexing the optical signals converted in units of lines into one wavelength-multiplexed optical signal, and each of the output line corresponding units includes a demultiplexer for demultiplexing in units of wavelengths the wavelength-multiplexed optical signal obtained by wavelength-multiplexing the optical signals having N wavelengths, opto-electric conversion means for converting outputs from the demultiplexer into electrical signals, respectively, and an output-side basic switch for distributing the cells converted into the electrical signals to a plurality of output ports.

The present invention is characterized in that basic switches are connected through wavelength multiplexing links such that the basic switches are connected through wavelength shifting means for distributing signals on the respective multiplexing links in units of wavelengths. The present invention is different from the prior art in that the number of links is reduced by wavelength multiplexing, the output-side basic switch is selected in units of wavelengths, and one output-side basic switch is connected to the respective input-side basic switches through links with different wavelengths.

In addition, the present invention is characterized in that some output ports of the output line corresponding units are connected to the corresponding input ports of the input line corresponding units, respectively, or some output ports of a certain input line corresponding unit are connected to input ports of another input line corresponding unit such that bypass routes for avoiding congestion can be set.

More specifically, the first gist of the present invention is an ATM switch for distributing cells arriving from a plurality of input lines to a plurality of output lines.

According to the present invention, there is provided an ATM switch comprising a plurality of input line corresponding units each connected to the plurality of input lines, a plurality of output line corresponding units each connected to the plurality of output lines, each of the input line corresponding units including an input-side basic switch for distributing cells which are respectively input to a plurality of input ports to N lines, electro-optic conversion means for converting the cells distributed to the N lines into optical signals having different wavelengths in units of lines, and a multiplexer for multiplexing the optical signals converted in units of lines into one wavelength-multiplexed optical signal, and each of the output line corresponding units including a demultiplexer for demultiplexing in units of wavelengths the wavelength-multiplexed optical signal obtained by wavelength-multiplexing the optical signals having N wavelengths, opto-electric conversion means for converting outputs from the demultiplexer into electrical signals, respectively, and an output-side basic switch for distributing the cells converted into the electrical signals to a plurality of output ports, and wavelength shifting means, arranged between the input line corresponding units and the output line corresponding units, for shifting the optical signals having different wavelengths included in a plurality of wavelength-multiplexed optical signals arriving from the input line corresponding units and outputting the wavelength-multiplexed optical signals.

Preferably, the wavelength shifting means includes a barrel shifter which distributes an optical signal having a pth (p=0, 1, 2, . . . , (N−1)) wavelength in an nth (n=0, 1, 2, . . . , (the number of input line corresponding units−1)) wavelength-multiplexed optical signal to the (n+p)th output and distributes the optical signal to the output of an ordinal number obtained by subtracting the number of output line corresponding units from (n+p) when n+p is equal to or larger than the number of output line corresponding units.

With this arrangement, the cells arriving from the plurality of input lines can be distributed to the output lines determined in units of wavelengths. At this time, use of the wavelength shifting means such as a barrel shifter allows to omit complex interconnections and increases the degree of freedom in increasing/decreasing the number of lines. More specifically, one output-side basic switch is connected to the respective input-side basic switches through links with different wavelengths when viewed from this output-side basic switch.

The number of input line corresponding units can be made equal to that of output line corresponding units. The numbers of input line corresponding units or output line corresponding units can be arbitrarily set. For this reason, an ATM switch having a high degree of freedom in design can be realized.

Wavelength multiplexing links are preferably arranged between the output terminals of the multiplexers and the wavelength shifting means and between the wavelength shifting means and the input terminals of the demultiplexers. With this arrangement, the number of links input/output to/from the wavelength shifting means can be reduced, so that an ATM switch which can omit complex interconnections can be realized. The number of basic switches can be easily changed by increasing/decreasing the number of links input/output to/from the wavelength shifting means. More specifically, the number of basic switches can be easily changed by increasing/decreasing not the number of outputs of the basic switches but the number of links input/output to/from the wavelength shifting means in correspondence with the number of basic switches themselves.

At least some input ports of the plurality of input line corresponding units may be connected to lines from any routes from other input line corresponding units to the plurality of output line corresponding units. With this arrangement, a plurality of routes via feedback routes can be selected as a route for transferring a cell from a certain input line to a certain output line. Therefore, in case of traffic localization, a bypass route can be formed to cope with the traffic localization.

To obtain simple and regular interconnections, at least some output ports of each output-side basic switch are preferably connected to input ports of an input-side basic switch corresponding to the output-side basic switch. Alternatively, at least some output ports of each input-side basic switch may be connected to input ports of the input-side basic switch of another input line corresponding unit.

Alternatively, for a combination of at least one input line corresponding unit and an output line corresponding unit corresponding to this input line corresponding unit, the output ports of the output line corresponding unit may be connected to the input ports of the input line corresponding unit. The combination of an input line corresponding unit and an output line corresponding unit corresponding to this input line corresponding unit is specialized to form bypass routes, and the remaining input line corresponding units and output line corresponding units can have the basic arrangement. With this arrangement, the degree of freedom in increasing/decreasing the number of input/output lines can be increased.

Electro-optic conversion means for converting cells into optical signals having different wavelengths in units of inputs and a multiplexer for multiplexing the optical signals converted in units of inputs into one wavelength-multiplexed optical signal may be arranged. This multiplexer is connected to the input side of the wavelength shifting means. The plurality of output line corresponding units may include at least one output line corresponding unit whose output ports are connected to the input ports of the electro-optic converters. With this arrangement, in the above specialized arrangement, the arrangement corresponding to the input line corresponding units can be simplified.

The second gist of the present invention is a large-scale ATM switch in which the above ATM switches are multiple-connected.

BRIEF DESCRIPTION OF THE DRAWINGS

FIG. 2 is a view showing the situation of optical signal distribution by a barrel shifter;

FIG. 8 is a view for explaining an operation performed when traffic localization occurs in the ATM switch according to the third embodiment of the present invention;

FIG. 10 is a view for explaining an operation performed when traffic localization occurs in the ATM switch according to the fourth embodiment of the present invention;

FIG. 12 is a view for explaining an operation performed when traffic localization occurs in the ATM switch according to the fifth embodiment of the present invention;

FIG. 15 is a block diagram of a multiple ATM switch according to the eight embodiment of the present invention;

FIG. 16 is a view showing the arrangement of a 4×4 basic switch;

FIG. 17 is a view showing the detailed arrangement of a cross point;

FIG. 18 is a view showing the arrangement of a 16×16 ATM switch using eight 4×4 basic switches.

DESCRIPTION OF THE PREFERRED EMBODIMENTS (First Embodiment)

Figure 1:
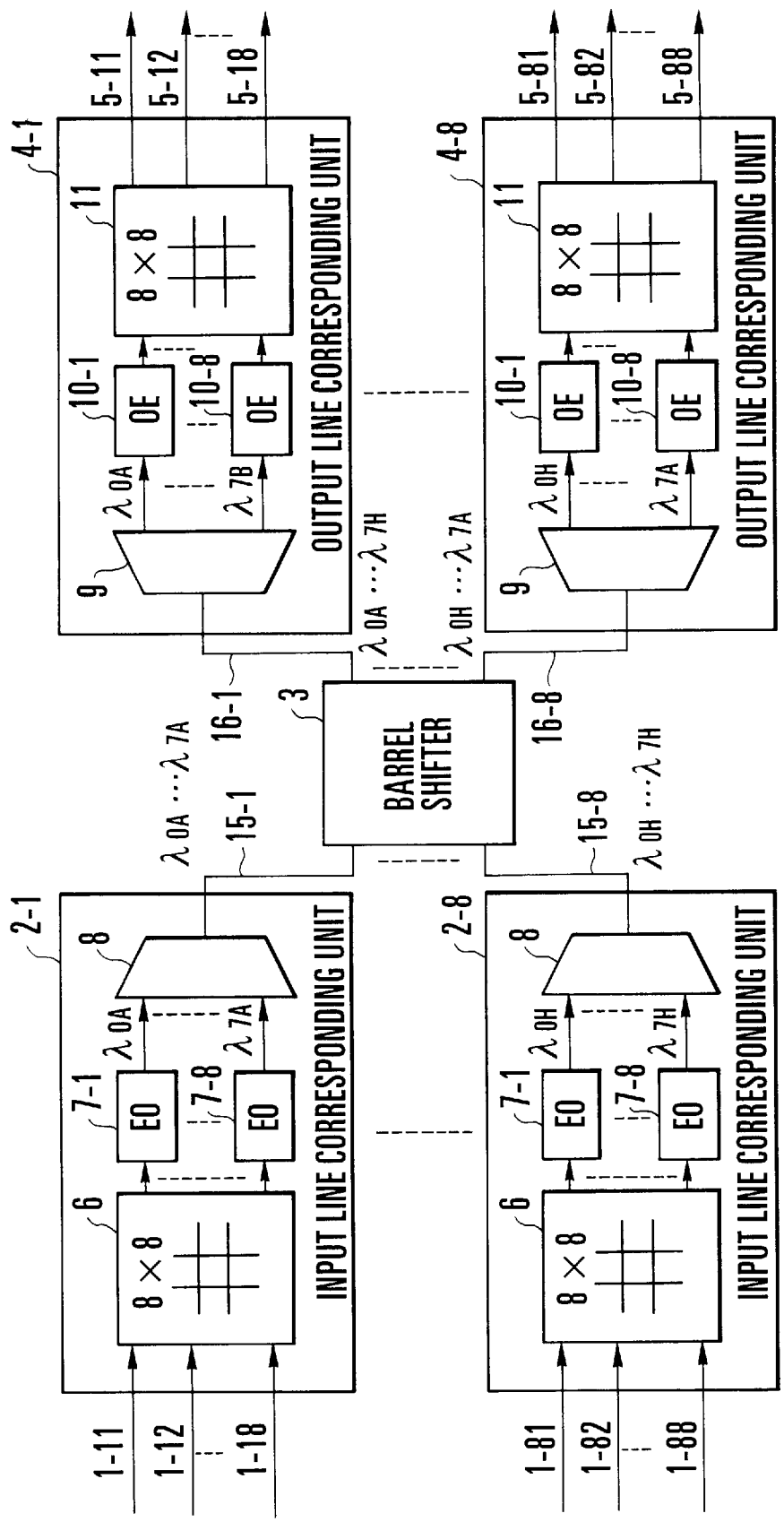
FIG. 1 is a block diagram of an ATM switch according to the first embodiment of the present invention.

The arrangement of the first embodiment of the present invention will be described below with reference to FIG. 1. FIG. 1 shows the arrangement of an ATM switch according to the first embodiment of the present invention.

In the present invention, an ATM switch which distributes arriving cells from 64 input lines to 64 output lines will be described.

The present invention has the following characteristic features. The ATM switch comprises input line corresponding units 2-1 to 2-8 (2-2 to 2-7 are not illustrated) each connected to eight lines of a total of 64 input lines, and output line corresponding units 4-1 to 4-8 (4-2 to 4-7 are not illustrated) each connected to eight lines of a total of 64 output lines. Each of the input line corresponding units 2-1 to 2-8 includes an 8×8 input-side basic switch 6 for distributing cells input to eight input ports 1-11 to 1-18, . . . , or 1-81 to 1-88 to the eight lines, electro-optic converters 7-1 to 7-8 for converting the cells distributed to the eight lines into optical signals having different wavelengths in units of lines, and a multiplexer 8 for multiplexing the optical signals converted in units of lines into one wavelength-multiplexed optical signal. Each of the output line corresponding units 4-1 to 4-8 includes a demultiplexer 9 for demultiplexing the wavelength-multiplexed optical signal formed by wavelength-multiplexing eight optical signals into optical signals having wavelengths different from each other, opto-electric converters 10-1 to 10-8 for converting outputs from the demultiplexer 9 into electrical signals, respectively, and an 8×8 output-side basic switch 11 for distributing the cells converted into the electrical signals to eight output ports 5-11 to 5-18, . . . , or 5-81 to 5-88. A barrel shifter 3 serving as a wavelength shifting means for shifting the optical signals having different wavelengths included in a plurality of wavelength-multiplexed optical signals arriving from the input line corresponding units 2-1 to 2-8 and outputting the wavelength-multiplexed optical signals is arranged between the input line corresponding units 2-1 to 2-8 and the output line corresponding units 4-1 to 4-8.

The barrel shifter 3 distributes an optical signal having the pth (p=0, . . . , N−1) wavelength in the nth (n=0, 1, . . . , (the number of input line corresponding units−1)) wavelength-multiplexed optical signal to the (n+p)th output. When n+p is equal to or larger than the number of output line corresponding units, the optical signal is distributed to the output of an ordinal number obtained by subtracting (the number of output line corresponding units) from (n+p).

In the first embodiment of the present invention, the number of the input line corresponding units 2-1 to 2-8 equals that of the output line corresponding units 4-1 to 4-8.

Wavelength multiplexing links 15-1 to 15-8 and wavelength multiplexing links 16-1 to 16-8 are arranged between the output terminals of the multiplexers 8 and the barrel shifter 3 and between the barrel shifter 3 and the input terminals of the demultiplexers 9, respectively.

The electro-optic converters 7-1 to 7-8 output optical signals having wavelengths $\lambda_0$ to $\lambda_7$, respectively. Suffixes A to H are added to clarify the input line corresponding units 2-1 to 2-8 in which the optical signals are converted. More specifically, the wavelengths of optical signals in the input line corresponding unit 2-1 are represented by $\lambda_{0A}$ to $\lambda_{7A}$, and the wavelengths of optical signals in the input line corresponding unit 2-8 are represented by $\lambda_{0H}$ to $\lambda_{7H}$.

The barrel shifter will be described with reference to FIG. 2. FIG. 2 shows the situation of optical signal distribution by the barrel shifter. As shown in FIG. 2, a description will be made assuming two input lines #0 and #1 and four output lines #0 to #3. Optical signals each having wavelengths $\lambda_0$ to $\lambda_3$ are transmitted to input lines #0 and #1, respectively. Output lines #0, #1, #2, and #3 are set as output lines of the optical signals having wavelengths $\lambda_0$, $\lambda_1$, $\lambda_2$, and $\lambda_3$ in input line #0, respectively. Output lines #1, #2, #3, and #0 are set as output lines of the optical signals having wavelengths $\lambda_0$, $\lambda_1$, $\lambda_2$, and $\lambda_3$ in input line #1, respectively. Output line #1 is used to output the wavelength $\lambda_1$ of the optical signals transmitted through input line #0. Output line #1 is also used to output the wavelength $\lambda_0$ of the optical signals transmitted through input line #1. In the ATM switch shown in FIG. 1, a cell to be output to the output line corresponding unit 4-1 may be input to the electro-optic converter 7-1 for converting the cell into an optical signal having the wavelength $\lambda_{0A}$. The cell input to the electro-optic converter 7-1 is converted into the optical signal having the wavelength $\lambda_{0A}$ and input to the barrel shifter 3 through the wavelength multiplexing link 15-1. The cell is then output to the wavelength multiplexing link 16-1 and arrives at the output line corresponding unit 4-1.

The barrel shifter is a known technique. It is not directly associated with the present invention, and a detailed description thereof will be omitted. The barrel shifter will be briefly described below (reference: Hiroshi Takahashi et al., "Polarization-insensitive arranged waveguide grating wavelength multiplexer on silicon", OPTICS LETTERS, Vol. 17, No. 7, Apr. 1 1992, pp. 499–501.

Figure 3:
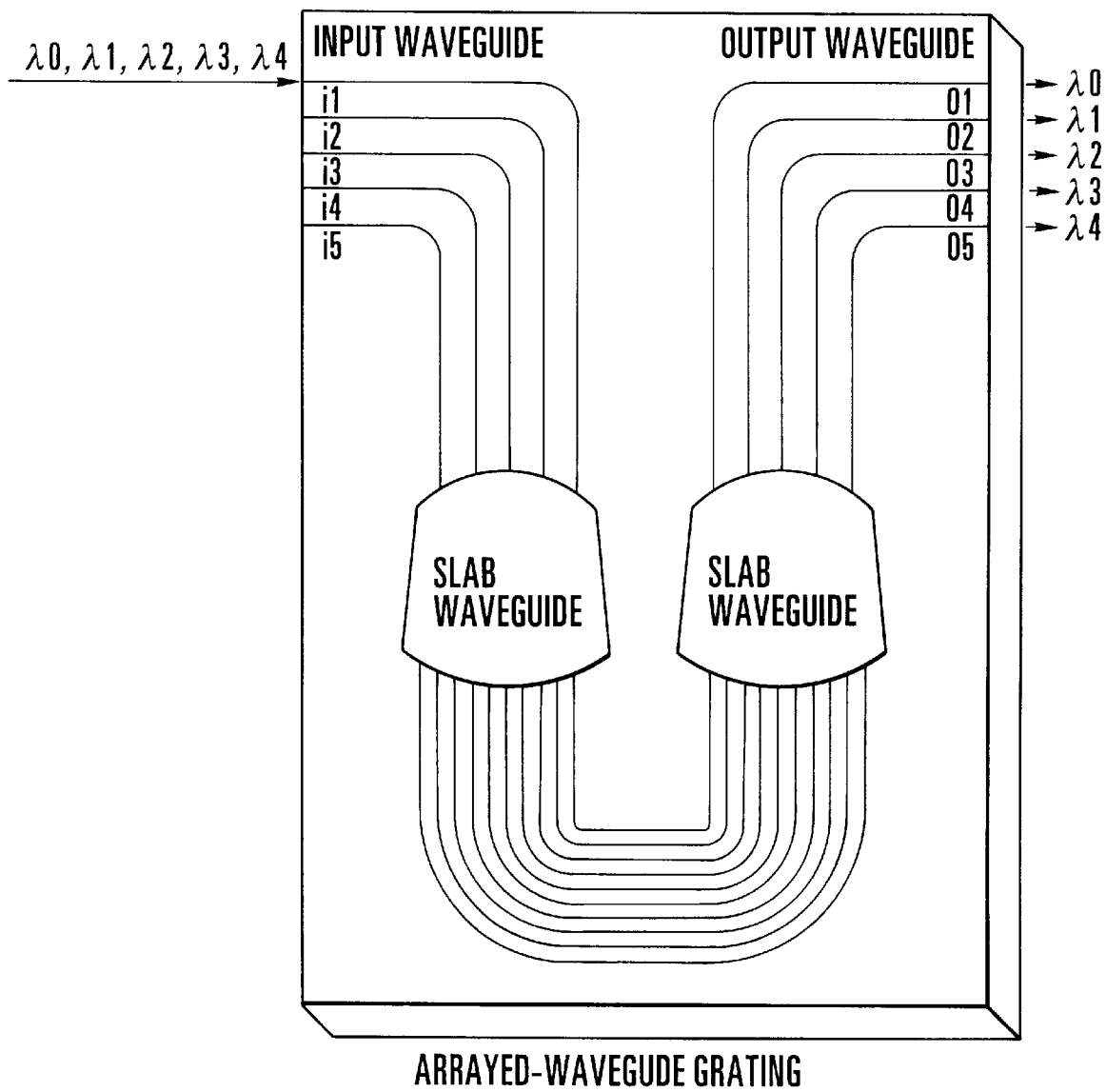
FIG. 3 is a view showing the concept of an arrayed-waveguide grating.

The optical device used in the present invention, i.e., the optical device called a barrel shifter is one of optical devices generally called "arrayed-waveguide gratings". FIG. 3 shows the concept of the arrayed-waveguide grating. Normally, the arrayed-waveguide grating is integrated on a substrate together with input and output waveguides and two slab waveguides each functioning as a collimator/condenser lens, and manufactured as a multiplexer/demultiplexer.

As shown in FIG. 3, the arrayed-waveguide grating is constituted by a plurality of waveguides arranged at an equal interval and having different lengths. The phase shift between the waveguides generates the same dispersion properties as those of a diffraction grating. Therefore, wavelength-multiplexed light from the input waveguide is demultiplexed and extracted from different output waveguides. This device is used as a multiplexer in a reverse direction. The slab waveguide has a sectorial shape whose center of curvature is at the end of the input or output waveguide. The slab waveguide also has a condenser function, like a concave mirror, because the axis of the waveguide of the arrayed-waveguide grating is directed to the center of curvature. To reduce the connection loss, a tapered waveguide is generally inserted between the channel waveguide and the slab waveguide, which constitute the arrayed-waveguide grating.

A wavelength interval $\Delta\lambda$ as one of the most important parameters of the multiplexer/demultiplexer using the arrayed-waveguide grating is represented as follows:

$$\Delta\lambda = \Delta x/(f \cdot m/n_x \cdot d) \quad \ldots (1)$$

$$m = (n_c \cdot \Delta L)/\lambda_0 \quad \ldots (2)$$

where $\Delta L$ is the difference between a pitch d of the arrayed-waveguide grating and the length of the waveguides constituting the arrayed-waveguide grating, f is the focal length (=radius of curvature) of the slab waveguide, $\Delta x$ is the interval of the input and output waveguides, and $n_x$ is the effective refractive index of the slab waveguide. The denominator $(f \cdot m/n_x \cdot d)$ on the right-hand side of equation (1) represents a linear dispersion and the proportional constant of the relationship between the wavelength and the condensing position, $n_c$ is the effective refractive index of the waveguide, $\lambda_0$ is the center wavelength of the arrayed-waveguide grating, i.e., the wavelength obtained from the central output waveguide, and m is the degree of diffraction of the arrayed-waveguide grating, i.e., a numerical value representing the phase shift of light between adjacent waveguides. As the value m becomes large, the angular dispersion becomes large. For this reason, wavelengths having a small interval can be multiplexed/demultiplexed (the wavelength resolving power is high). For a conventional diffraction grating, the pitch must be reduced to increase the resolving power, though there is a process limitation. In the arrayed-waveguide grating, the waveguide can be elongated to increase the degree of diffraction, thereby easily realizing a high resolving power. This is the largest difference between the arrayed-waveguide grating and the conventional diffraction grating.

As is represented by equation (2), since m is an arbitrary integer, a plurality of center wavelengths $\lambda_0$ are present in one arrayed-waveguide grating. For example, when the optical path difference $\Delta L = 126 \mu M$, and $n_c = 1.45$, $\lambda_0 = 1548.3$ nm for m=118, and $\lambda_0 = 1535.3$ nm for m=119. That is, light components having a plurality of wavelengths $\lambda_0$ including 1548.3 nm and 1535.3 nm are output from the central output port. Therefore, a band usable without overlapping the wavelengths is 13 nm. For wavelength division multiplexing at a wavelength interval of 0.8 nm, the maximum number of wavelengths is "16". When the value m increases, the wavelength resolving power increases. However, the band usable without overlapping the wavelengths becomes narrow, so the value m must be carefully set.

The barrel shifter used in the present invention is an arrayed-waveguide grating which positively utilizes its nature (circulation properties) that light components having the same wavelength are repeatedly output in units of bands usable without overlapping the wavelengths, as shown in Table 1.

TABLE 1

| I/O | O1 | O2 | O3 | O4 | O5 |
|---|---|---|---|---|---|
| i1 | $\lambda_0$ | $\lambda_1$ | $\lambda_2$ | $\lambda_3$ | $\lambda_4$ |
| i2 | $\lambda_4$ | $\lambda_0$ | $\lambda_1$ | $\lambda_2$ | $\lambda_3$ |
| i3 | $\lambda_3$ | $\lambda_4$ | $\lambda_0$ | $\lambda_1$ | $\lambda_2$ |
| i4 | $\lambda_2$ | $\lambda_3$ | $\lambda_4$ | $\lambda_0$ | $\lambda_1$ |
| i5 | $\lambda_1$ | $\lambda_2$ | $\lambda_3$ | $\lambda_4$ | $\lambda_0$ |

Figure 4:
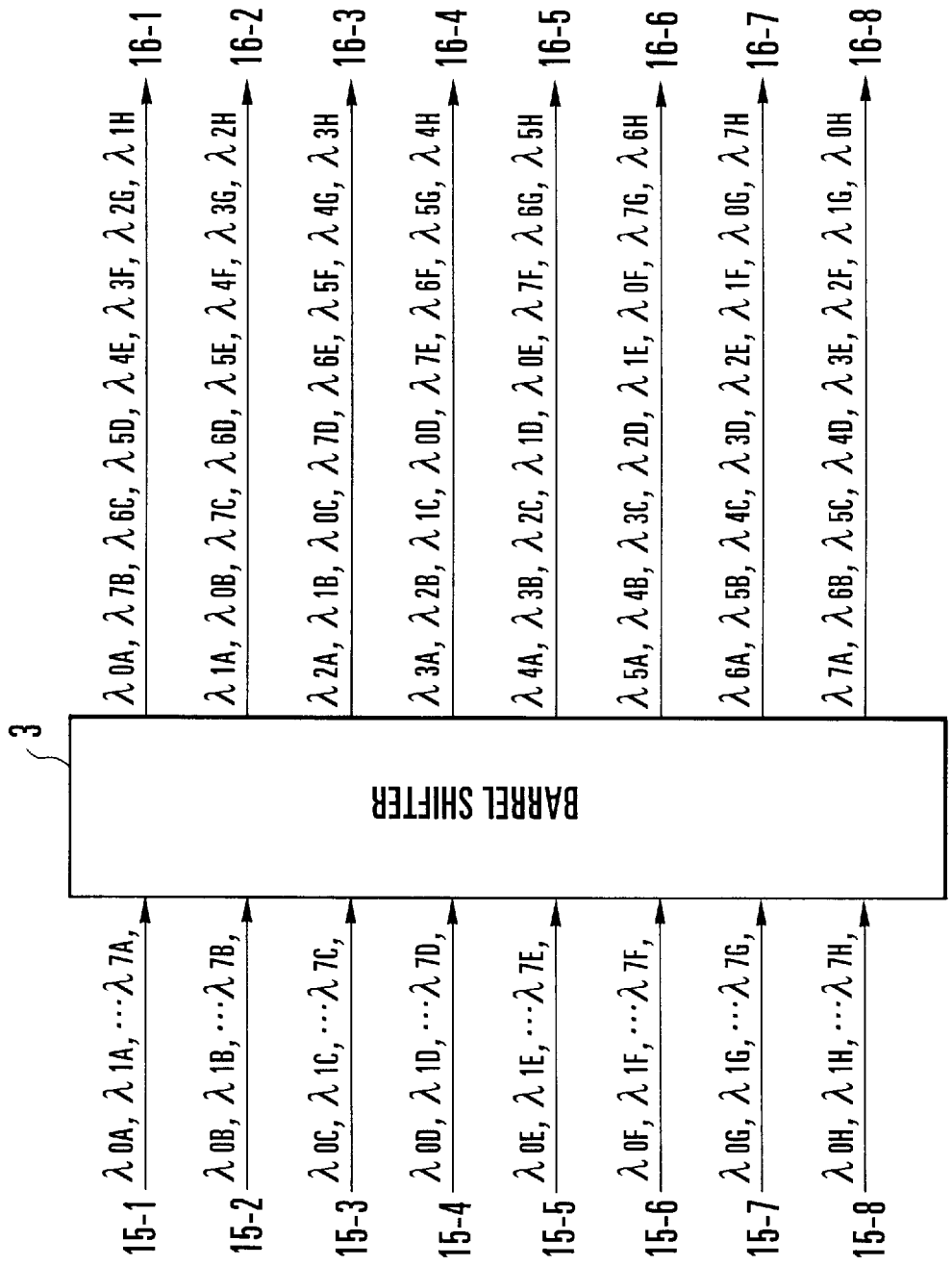
FIG. 4 is a view showing the situation of input/output of the barrel shifter.

FIG. 4 shows the situation of input/output of the barrel shifter 3 shown in FIG. 1. One output-side basic switch is connected to the respective input-side basic switches through links with different wavelengths when viewed from this output-side basic switch.

The operation of the first embodiment of the present invention will be described next. Cells input to the input line corresponding units 2-1 to 2-8 are switched by the input-side basic switches 6. The output line corresponding units 4-1 to 4-8 as destinations are determined in accordance with output lines switched by the input-side basic switches 6. For example, when one of cells input to the input line corresponding unit 2-1 is to use the output line corresponding unit 4-1 as an output line, the cell may be input to the electro-optic converter 7-1 for converting the cell into an optical signal having the wavelength $\lambda_{0A}$. The cell input to the electro-optic converter 7-1 is converted into the optical signal having the wavelength $\lambda_{0A}$ and input to the barrel shifter 3 through the wavelength multiplexing link 15-1 and arrives at the output line corresponding unit 4-1 through the wavelength multiplexing link 16-1.

The operation of the input line corresponding unit 2-1 will be described in more detail. Cells output from the input-side basic switch 6 are converted into optical signals having the wavelengths $\lambda_{0A}$ to $\lambda_{7A}$ by the electro-optic converters 7-1 to 7-8, respectively. These optical signals are multiplexed by the multiplexer 8 into one serial signal and output to the wavelength multiplexing link 15-1. The barrel shifter 3 selectively distributes the optical signals having the wavelengths $\lambda_{0A}$ to $\lambda_{7A}$ to the wavelength multiplexing links 16-1 to 16-8. On the other hand, when attention is paid to one wavelength multiplexing link, e.g., 16-1, optical signals from the input line corresponding units 2-1 to 2-8 are wavelength-multiplexed and transferred to the wavelength multiplexing link 16-1.

The demultiplexer 9 demultiplexes the wavelength-multiplexed optical signal from the input line corresponding units 2-1 to 2-8. The opto-electric converters 10-1 to 10-8 convert the optical signals into cells of electrical signals. The cells are output to the output lines by the output-side basic switch 11 through the desired output ports 5-11 to 5-18, respectively.

In connection between the input port 1-12 of the input-side basic switch 6 of the input line corresponding unit 2-1 and the output port 5-14 of the output-side basic switch 11 of the output line corresponding unit 4-1, the electro-optic converter 7-1 at the uppermost stage is selected by the input-side basic switch 6. The optical signal having the wavelength$\lambda_{0A}$ is transferred to the output line corresponding unit 4-1 through the barrel shifter 3, demultiplexed by the demultiplexer 9 to the output-side basic switch 11, and connected to the output port 5-14 by the basic switch 11.

As described above, cells arriving from the plurality of input lines can be distributed to the output lines which are determined in units of wavelengths. When the barrel shifter 3 is used, the internal links of the ATM switch can be simplified.

When a plurality of ATM switches of the present invention are connected, a large-scale ATM switch having, e.g., three or five stages can be constituted.

(Second Embodiment)

Figure 5:
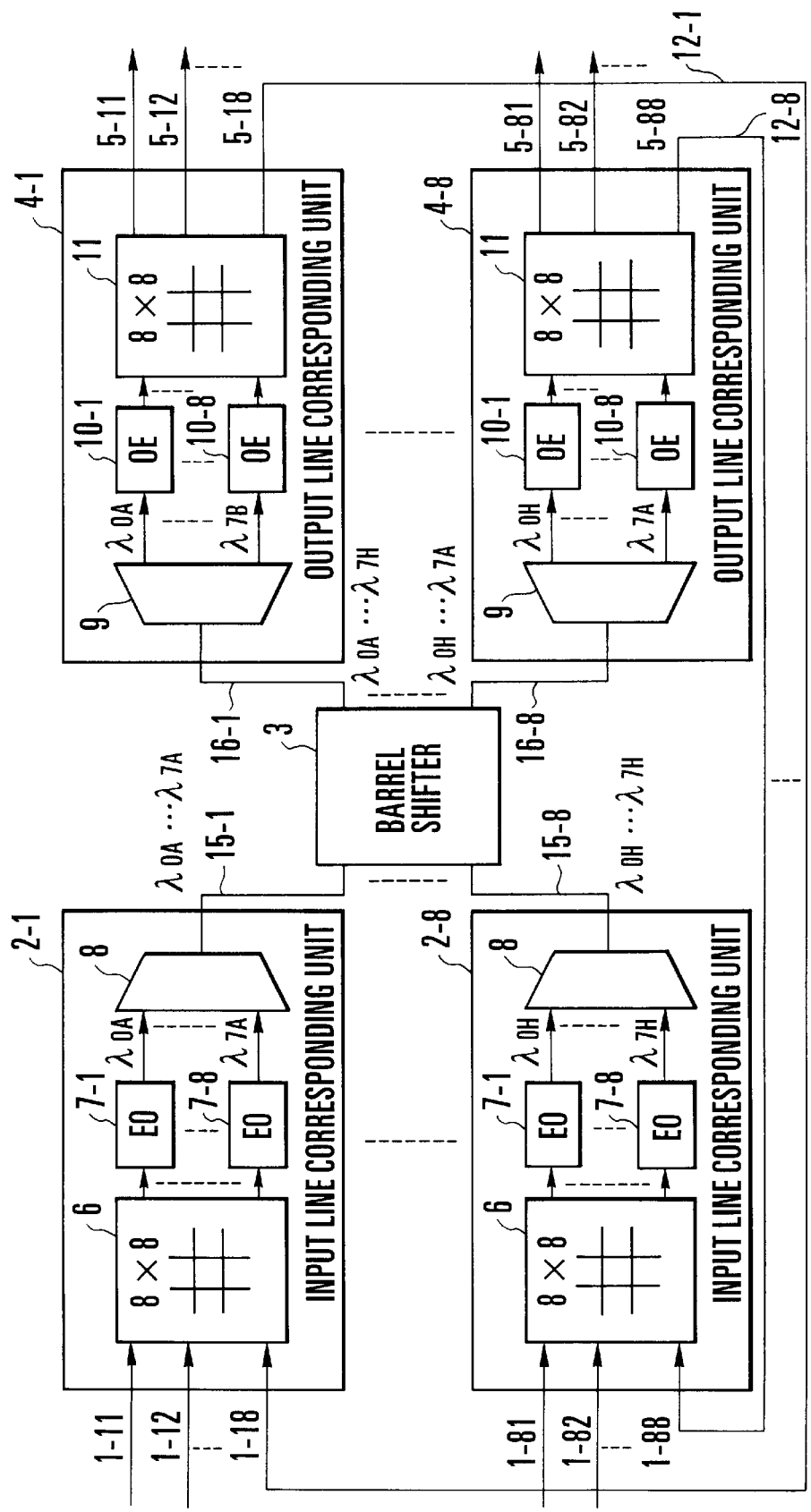
FIG. 5 is a block diagram of an ATM switch according to the second embodiment of the present invention.

The arrangement of the second embodiment of the present invention will be described with reference to FIGS. 5 and 6. FIG. 5 shows an ATM switch according to the second embodiment of the present invention. In the second embodiment, output ports 5-11 to 5-18, ..., 5-81 to 5-88 of output-side basic switches 11 of output line corresponding units 4-1 to 4-8 are connected to input ports 1-11 to 1-18, ..., 1-81 to 1-88 of input-side basic switches 6 of input line corresponding units 2-1 to 2-8 through lines 12-1 to 12-8. With this arrangement, when partial congestion occurs in the ATM switch, a bypass route for avoiding the congested route can be set.

Figure 6:
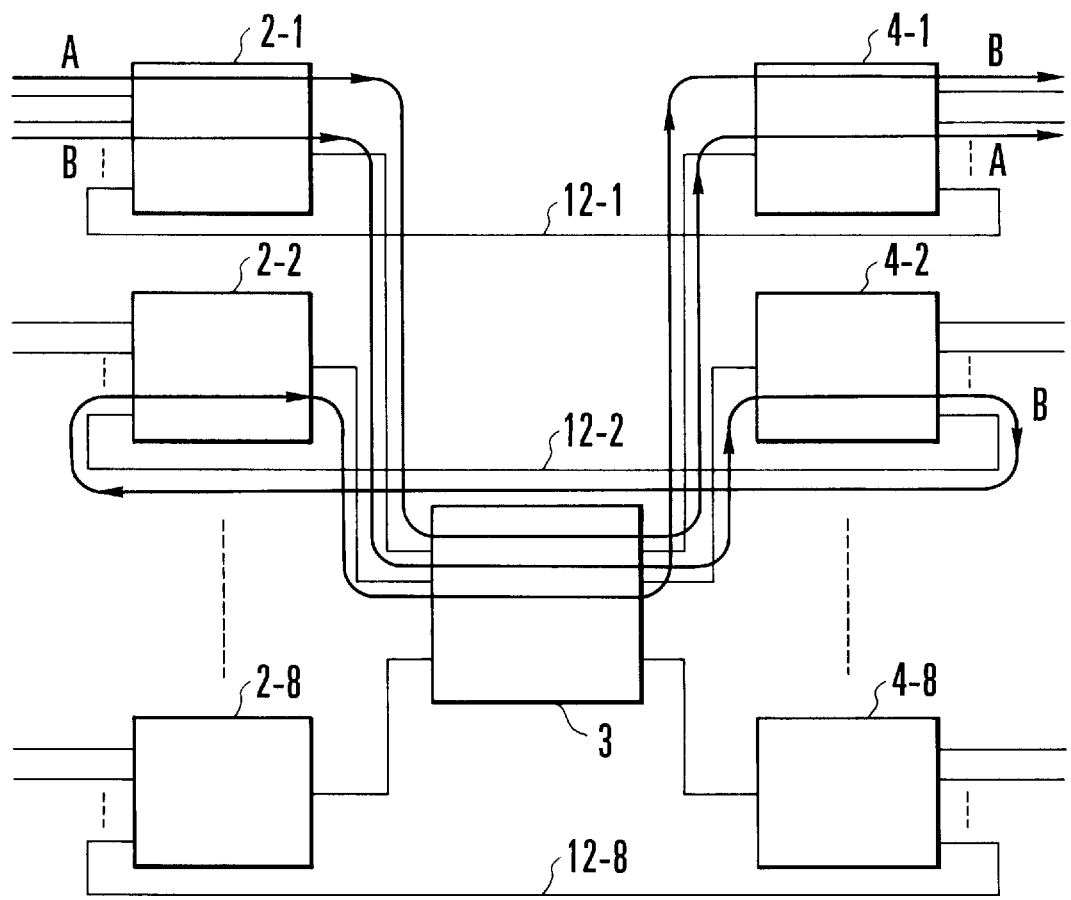
FIG. 6 is a view for explaining an operation performed when traffic localization occurs in the ATM switch according to the second embodiment of the present invention.

FIG. 6 explains an operation performed when traffic localization occurs in the ATM switch according to the second embodiment of the present invention and shows a case wherein the traffic of the input line corresponding unit 2-1 concentrates to the output line corresponding unit 4-1. To transfer a cell from the input line corresponding unit 2-1 to the output line corresponding unit 4-1, a wavelength $\lambda_{OA}$ is selected, and the cell is automatically transferred by a barrel shifter 3. However, when the transfer rate of the input ports 1-11 to 1-18, ..., 1-81 to 1-88 is 1 Gb/s, traffics of 8 Gb/s may localize between the input line corresponding unit 2-1 and the output line corresponding unit 4-1 at maximum. Assume that the throughput at which a cell can be transferred via one wavelength of wavelength multiplexing links 15-1 to 15-8 or 16-1 to 16-8 is 1 Gb/s. When a cell is to be directly transferred from the input line corresponding unit 2-1 to the output line corresponding unit 4-1, only cells of 1 Gb/s of the cells of 8 Gb/s can be transferred. The remaining cells of 7 Gb/s are handled as a call loss. To avoid this, a feedback route is used. In the example shown in FIG. 6, in addition to a route A for directly transferring a cell from the input line corresponding unit 2-1 to the output line corresponding unit 4-1, a route B is arranged to select $\lambda_{1A}$ for some cells to be transferred to the output line corresponding unit 4-1, and transfer the cells to the output line corresponding unit 4-2. The cell from the output line corresponding unit 4-2 is fed back to the input line corresponding unit 2-2 via the feedback loop and transferred from the input line corresponding unit 2-2 to the output line corresponding unit 4-1. Therefore, congestion between the input line corresponding unit 2-1 and the output line corresponding unit 4-1 can be avoided.

Although one bypass route has been exemplified above, seven bypass routes can be additionally ensured between the input line corresponding unit 2-1 and the output line corresponding unit 4-1. Consequently, a total of eight routes can be used. In addition, not one but a plurality of feedback routes can be set between the input line corresponding units 2-1 to 2-8 and the output line corresponding units 4-1 to 4-8.

(Third Embodiment)

Figure 7:
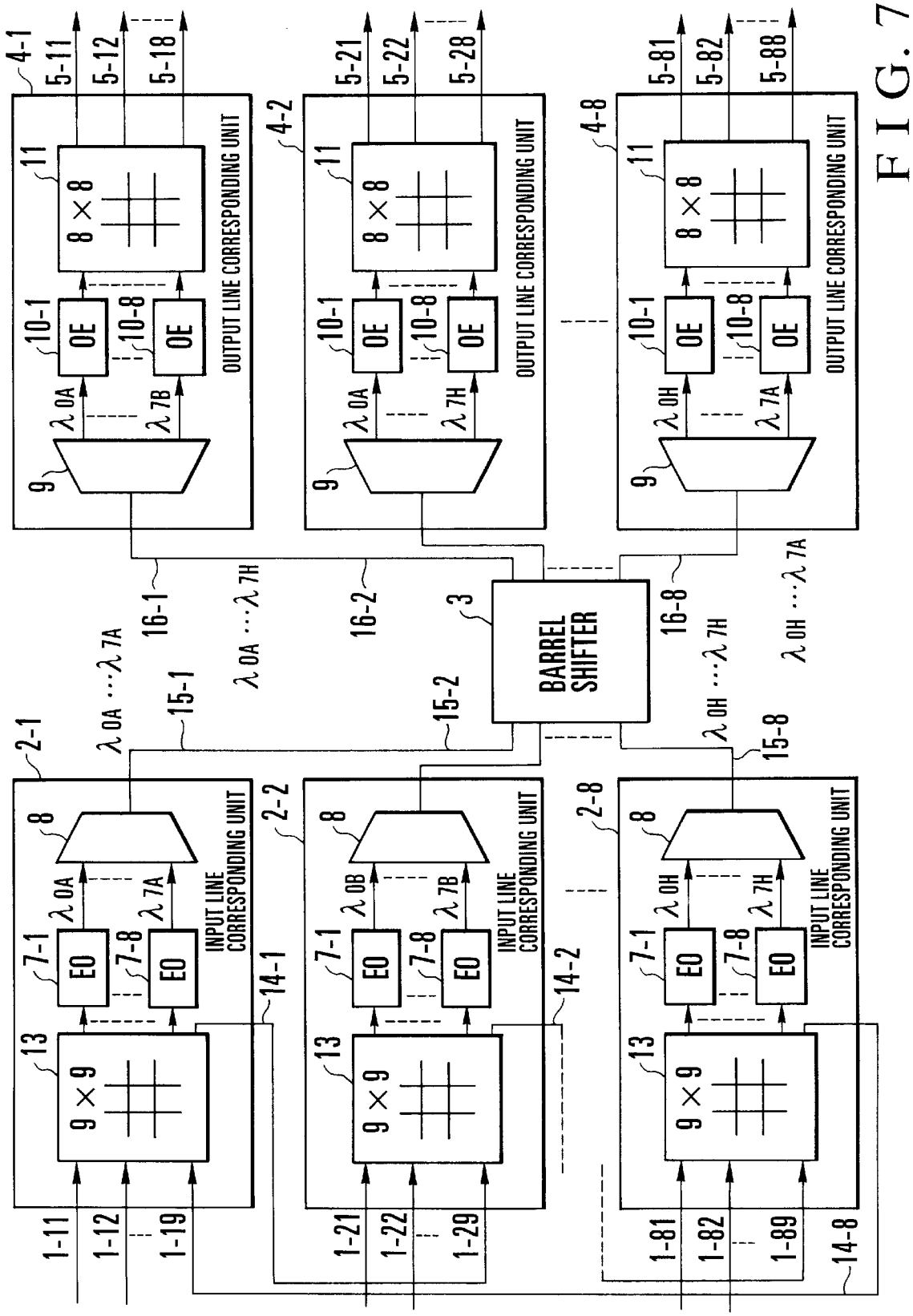
FIG. 7 is a block diagram of an ATM switch according to the third embodiment of the present invention.

The third embodiment of the present invention will be described with reference to FIGS. 7 and 8. FIG. 7 shows an ATM switch according to the third embodiment of the present invention. The third embodiment of the present invention includes a circuit in which each of input line corresponding units 2-1 to 2-8 has a 9×9 input-side basic switch 13 for distributing cells input to nine input ports 1-11 to 1-19, 1-21 to 1-29, ..., or 1-81 to 1-89, and one of the output ports of each input-side basic switch 13 is connected to the input port 1-19, 1-29, ..., or 1-89 of the corresponding one of the input line corresponding units 2-1 to 2-8 without interposing electro-optic converters 7-1 to 7-8.

According to the third embodiment, no bypass route need be set for the subsequent paths. Only by increasing the number of input/output ports of the input-side basic switch 13 by one, an ATM switch having a 64×64 arrangement can be constituted.

More specifically, in the third embodiment of the present invention, eight input lines are connected to each of the input line corresponding units 2-1 to 2-8, and eight output lines are connected to each of output line corresponding units 4-1 to 4-8. Instead of the 8×8 input-side basic switch 6 in the first and second embodiments of the present invention, each of the input line corresponding units 2-1 to 2-8 has the 9×9 basic switch, i.e., the input-side basic switch 13 for distributing cells input to the nine input ports to the nine lines. Of these nine lines, eight lines are connected to the electro-optic converters 7-1 to 7-8, respectively, as in the first and second embodiments of the present invention. The remaining one line of each input-side basic switch 13 is connected such that the line of the input-side basic switch 13 of the input line corresponding unit 2-(8-k) (k=1, 2, ..., 8) is connected to an input port of the input-side basic switch 13 of the input line corresponding unit 2-(8-(k+1)) (when k=8, the input line corresponding unit 2-1). The remaining arrangement in each of the input line corresponding units 2-1 to 2-8, and the arrangement of a barrel shifter 3 and the output line corresponding units 4-1 to 4-8 are the same as those in the first embodiment of the present invention.

FIG. 8 explains an operation performed when traffic localization occurs in the ATM switch according to the third embodiment of the present invention. Assume that the traffic localizes between the input line corresponding unit 2-1 and the output line corresponding unit 4-1, as in the description of FIG. 6. In this case, in addition to a route A for directly transferring a cell from the input line corresponding unit 2-1 to the output line corresponding unit 4-1, a route B is set. With this route B, some cells to be transferred to the output line corresponding unit 4-1 are transferred to the input line corresponding unit 2-2 by using the line 14-1, and $\lambda_{7B}$ is selected to transfer the cells to the output line corresponding unit 4-1. When traffics also concentrate between the input line corresponding unit 2-2 and the output line corresponding unit 4-1, some cells from the input line corresponding unit 2-1 can be further transferred to the input line corresponding unit 2-3. With this arrangement, a plurality of routes can be used to transfer cells from the input line corresponding unit 2-1 to the output line corresponding unit 4-1. In addition, not only one but a plurality of routes can be set among the input line corresponding units 2-1 to 2-8.

In the third embodiment of the present invention, an arrangement which includes a regular wire structure and can be easily practiced has been described. However, the present invention can be practiced even for another connection form. For example, outputs from some opto-electric converters 10-k of the output line corresponding units 4-1 to 4-8 can be connected to the input line corresponding units 2-1 to 2-8. Alternatively, some outputs from the input-side basic switch 13 can be connected to a common input line corresponding unit 2-k.

(Fourth Embodiment)

Figure 9:
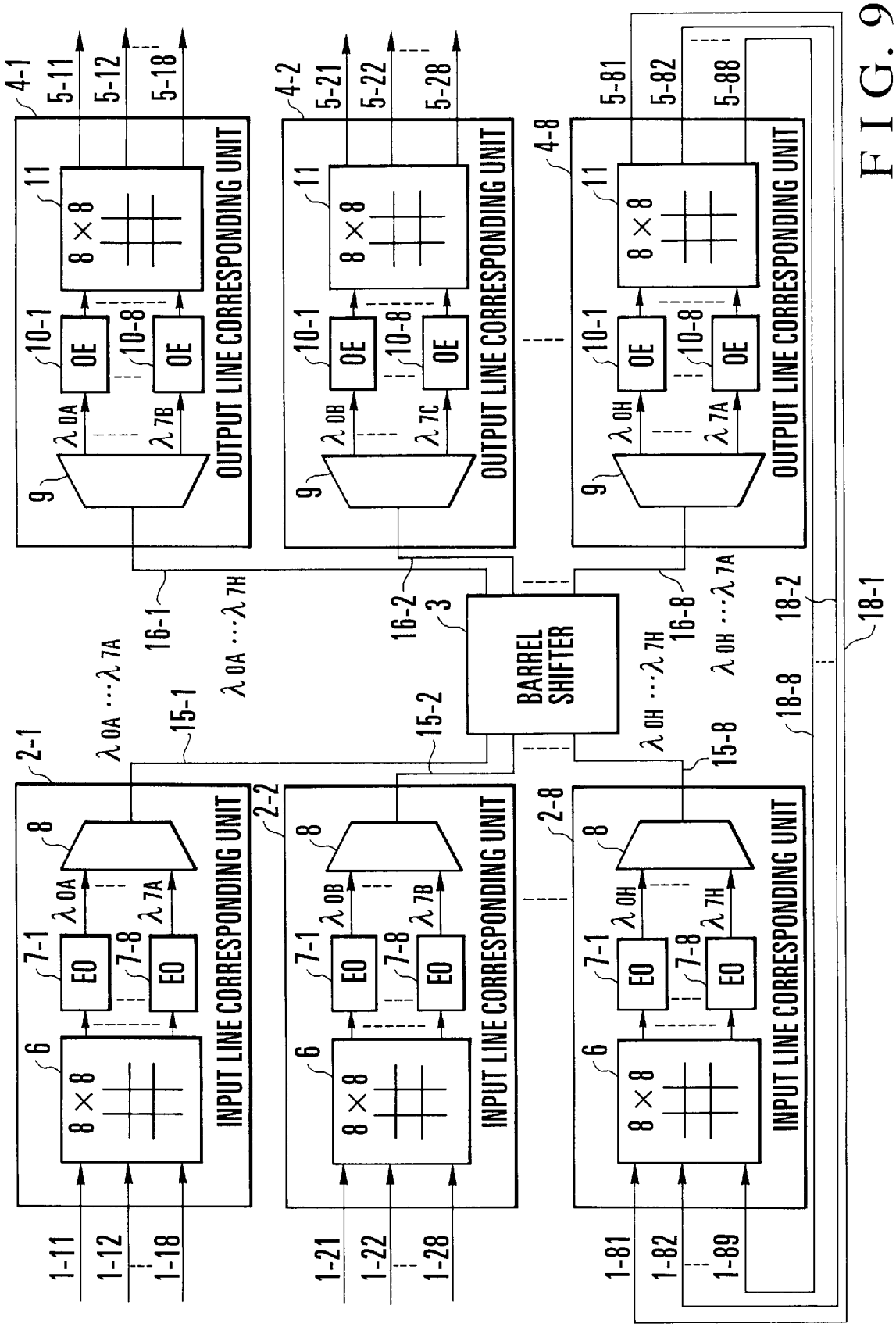
FIG. 9 is a block diagram of an ATM switch according to the fourth embodiment of the present invention.

The fourth embodiment of the present invention will be described with reference to FIGS. 9 and 10. FIG. 9 shows an ATM switch according to the fourth embodiment of the present invention. In the fourth embodiment of the present invention, output ports 5-81 to 5-88 of an output-side basic switch 11 of an output line corresponding unit 4-8 are connected to input ports 1-81 to 1-88 of an input-side basic switch 6 of an input line corresponding unit 2-8 through lines 18-1 to 18-8 constituting a feedback circuit, respectively, thereby specializing the input line corresponding unit 2-8 and the output line corresponding unit 4-8 to set bypass routes.

According to the fourth embodiment of the present invention, remaining input line corresponding units 2-1 to 2-7 and output line corresponding units 4-1 to 4-7 can have the basic arrangement shown in the first embodiment of the present invention. Therefore, the input line corresponding units and output line corresponding units can be easily increased/decreased.

FIG. 10 explains an operation performed when traffic localization occurs in the ATM switch according to the fourth embodiment of the present invention. Assume that the traffics localize between the input line corresponding unit 2-1 and the output line corresponding unit 4-1, as in the description of FIG. 6. In this case, in addition to a route A for directly transferring cells from the input line corresponding unit 2-1 to the output line corresponding unit 4-1, a route B is set to transfer some cells to be transferred to the output line corresponding unit 4-1 to the output line corresponding unit 4-8. The cells are further transferred to the input line corresponding unit 2-8 and then transferred from the input line corresponding unit 2-8 to the output line corresponding unit 4-2. As described above, a plurality of routes can be used between the input line corresponding unit 2-1 and the output line corresponding unit 4-1.

(Fifth Embodiment)

Figure 11:
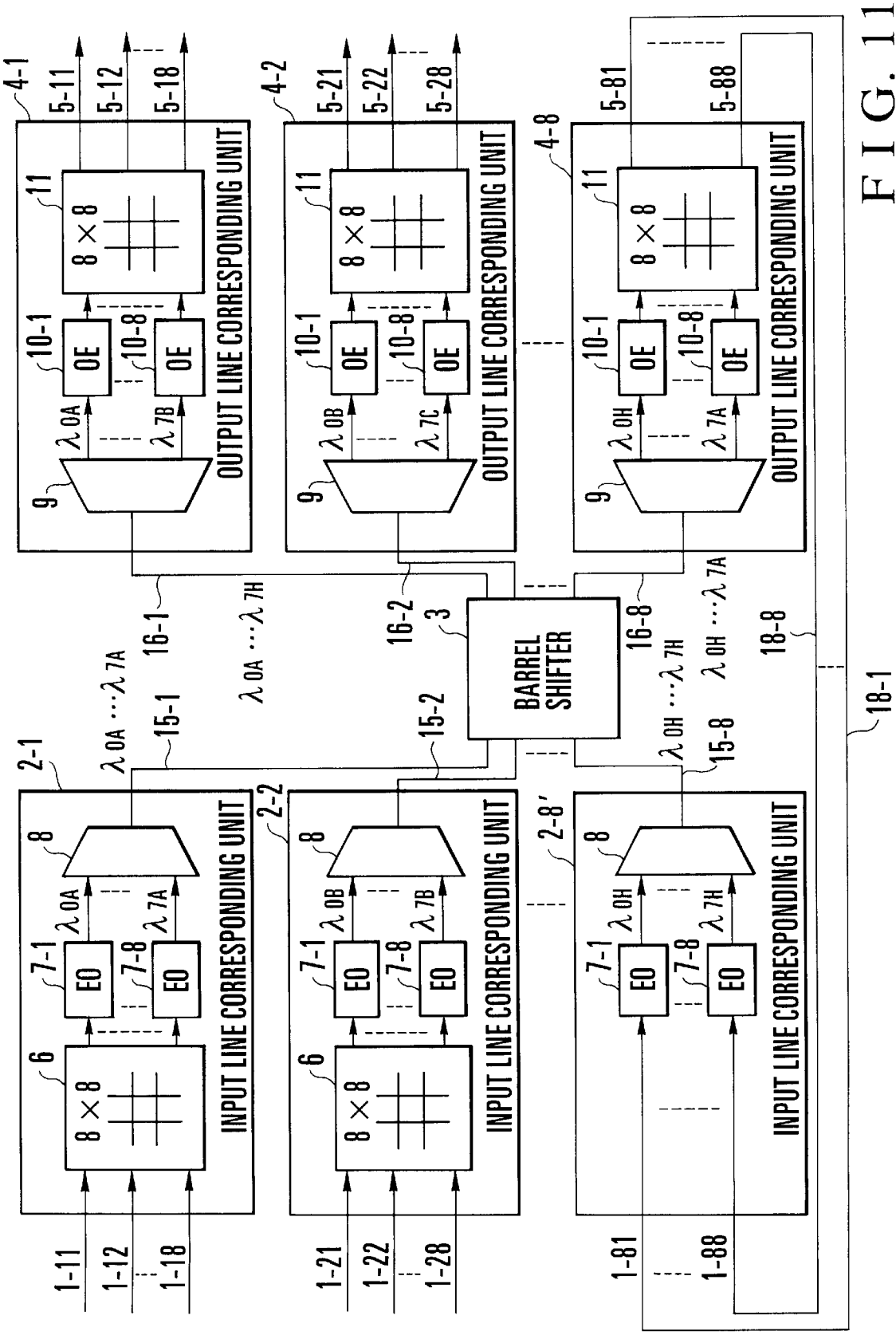
FIG. 11 is a block diagram of an ATM switch according to the fifth embodiment of the present invention.

The fifth embodiment of the present invention will be described with reference to FIGS. 11 and 12. FIG. 11 shows an ATM switch according to the fifth embodiment of the present invention. In the fifth embodiment of the present invention, a block without any input-side basic switch 6 is arranged as an input line corresponding unit 2-8', and output ports 5-81 to 5-88 of an output-side basic switch 11 of an output line corresponding unit 4-8 are connected to the input terminals of electro-optic converters 7-1 to 7-8 through lines 18-1 to 18-8 constituting a feedback circuit, respectively, thereby specializing the input line corresponding unit 2-8' and the output line corresponding unit 4-8 to set bypass routes.

According to the fifth embodiment of the present invention, remaining input line corresponding units 2-1 to 2-7 and output line corresponding units 4-1 to 4-7 can have the basic arrangement shown in the first embodiment of the present invention. Therefore, the input line corresponding units and output line corresponding units can be easily increased/decreased.

In addition, according to the fifth embodiment of the present invention, the input line corresponding unit 2-8' can have a simpler arrangement than that of the fourth embodiment of the present invention. The input line corresponding unit 2-8' has no input-side basic switch 6. However, desired routes can be set on the side of the output-side basic switch 11 of the output line corresponding unit 4-8.

FIG. 12 explains an operation performed when traffic localization occurs in the ATM switch according to the fifth embodiment of the present invention. Assume that the traffics localize between the input line corresponding unit 2-1 and the output line corresponding unit 4-1, as in the description of FIG. 6. In this case, in addition to a route A for directly transferring cells from the input line corresponding unit 2-1 to the output line corresponding unit 4-1, a route B is set to transfer some cells to be transferred to the output line corresponding unit 4-1 to the output line corresponding unit 4-8. The cells are further transferred to the input line corresponding unit 2-8' and then transferred from the input line corresponding unit 2-8' to the output line corresponding unit 4-2. As described above, a plurality of routes can be used between the input line corresponding unit 2-1 and the output line corresponding unit 4-1.

(Sixth Embodiment)

Figure 13:
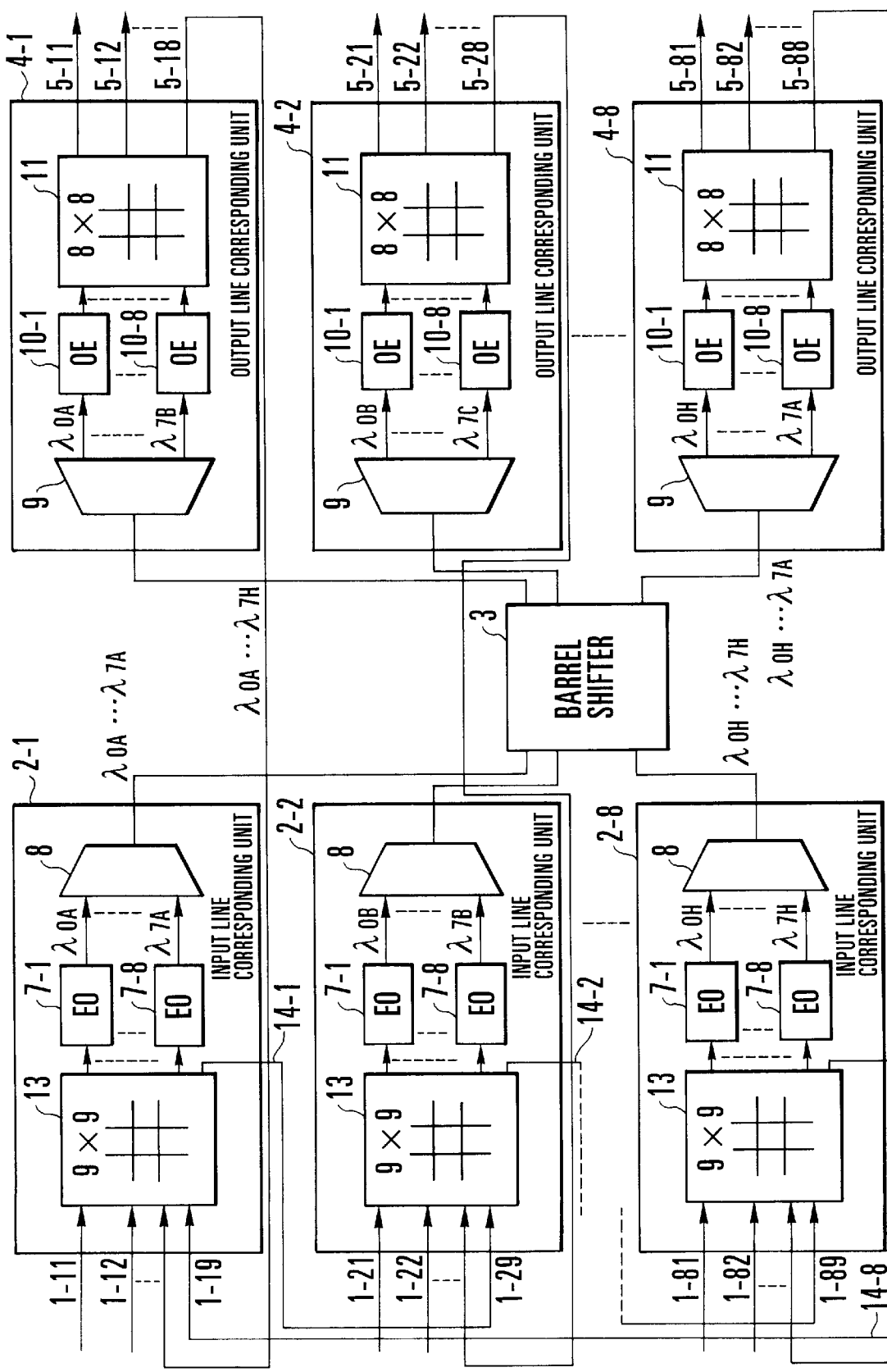
FIG. 13 is a block diagram of the sixth embodiment of the present invention.

The sixth embodiment of the present invention will be described with reference to FIG. 13. FIG. 13 shows the sixth embodiment of the present invention. In the sixth embodiment of the present invention, the arrangement shown in the second embodiment of the present invention is combined with that shown in the third embodiment of the present invention.

When traffic localization occurs in the ATM switch of the sixth embodiment of the present invention, not only the bypass route shown in FIG. 6 but also that shown in FIG. 8 can be set. With this arrangement, the degree of freedom in setting the bypass route can be increased.

(Seventh Embodiment)

Figure 14:
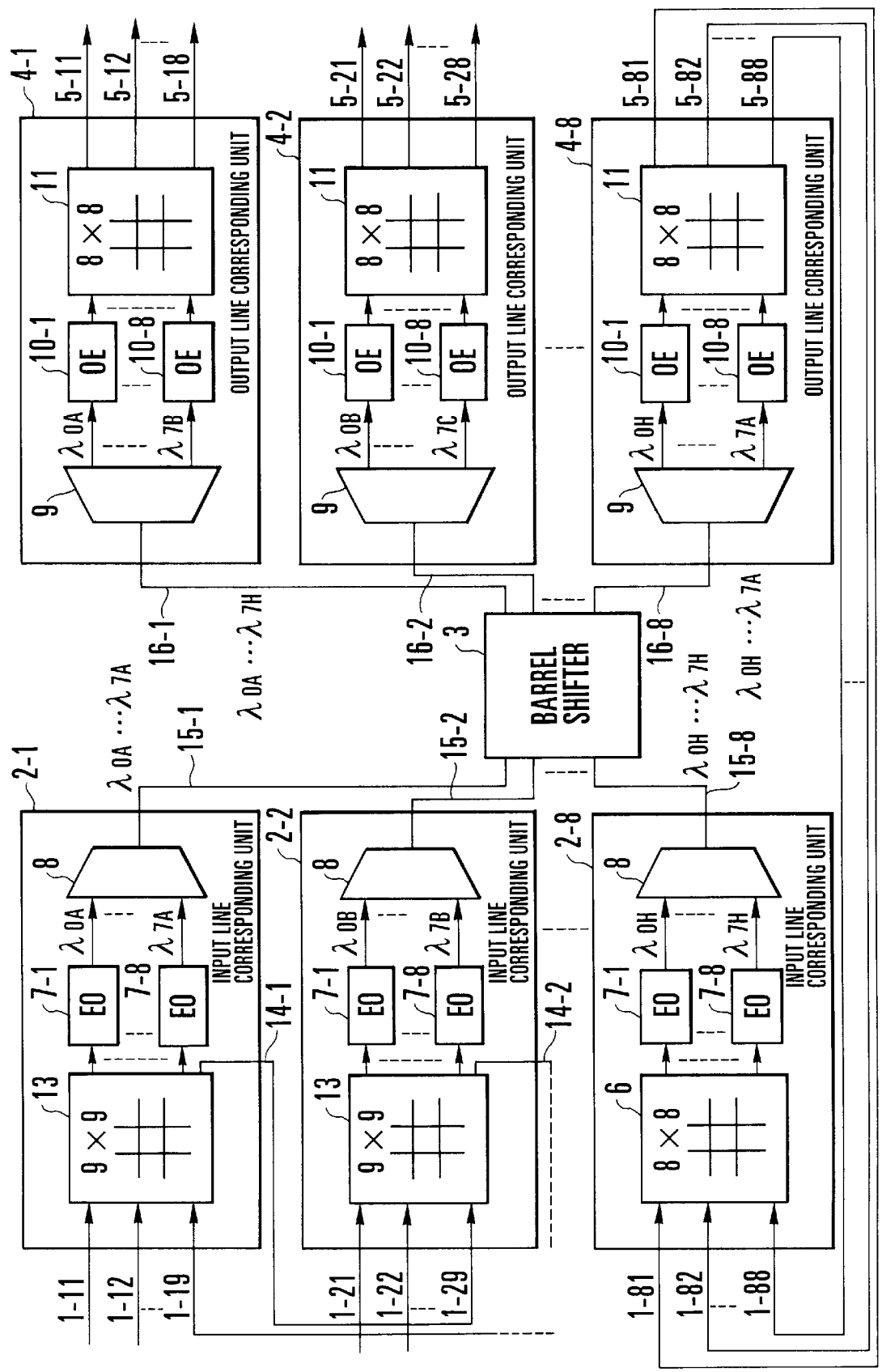
FIG. 14 is a block diagram of the seventh embodiment of the present invention.
Figure 19:
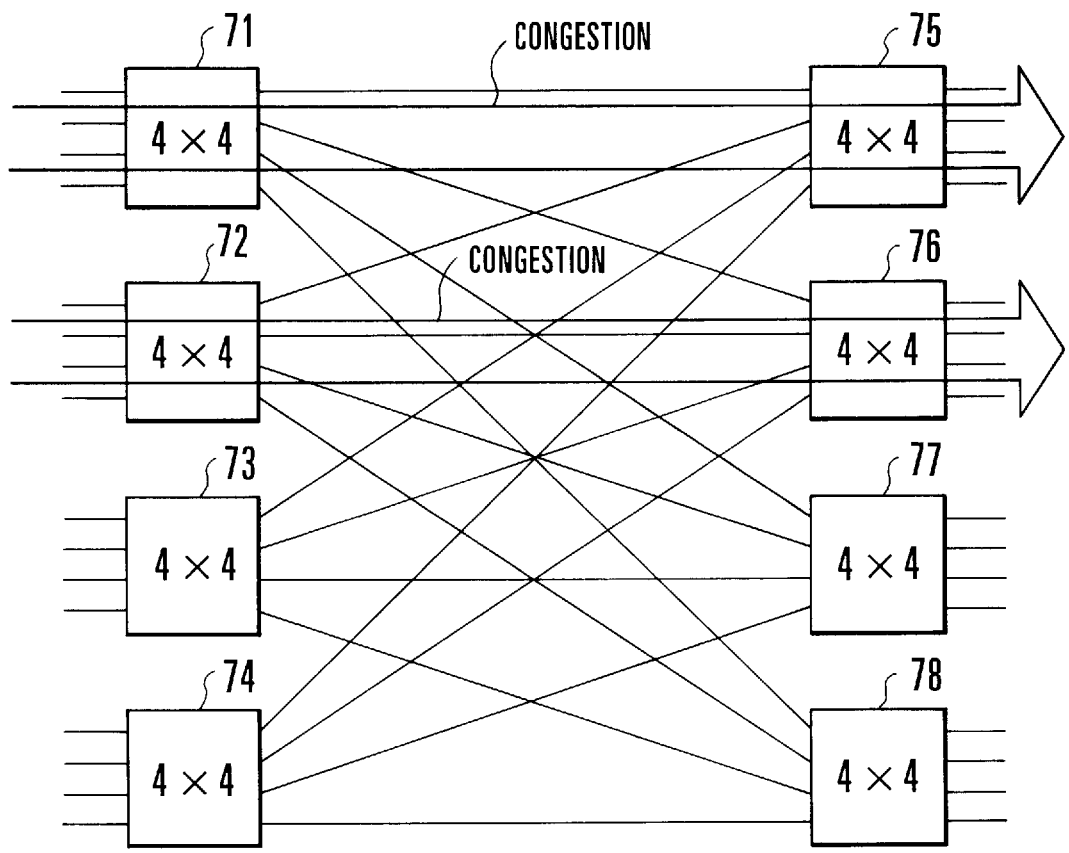
FIG. 19 is a view showing the link congestion situation.

The seventh embodiment of the present invention will be described with reference to FIG. 14. FIG. 14 shows the seventh embodiment of the present invention. In the seventh embodiment of the present invention, the arrangement shown in the third embodiment of the present invention is combined with that shown in the fourth embodiment of the present invention.

When traffic localization occurs in the ATM switch of the seventh embodiment of the present invention, not only the bypass route shown in FIG. 6 but also that shown in FIG. 10 can be set. With this arrangement, the degree of freedom in setting the bypass route can be increased.

The same description can apply to a combination of the arrangement shown in the third embodiment of the present invention and that shown in the fifth embodiment of the present invention.

As has been described above, the present invention can solve the complex link connection and cope with traffic localization. In addition, a large-scale ATM switch with the minimum quantity of hardware can be realized. Furthermore, an ATM switch capable of flexibly coping with an increase/decrease in number of input/output lines can be realized.

(Eighth Embodiment)

The eighth embodiment of the present invention will be described with reference to FIG. 15. FIG. 15 shows the arrangement according to the eighth embodiment of the present invention. In the eighth embodiment, the present invention is applied to a large-scale ATM switch.

In this embodiment, a first-stage ATM switch SW1 has the same arrangement as that shown in the block diagram of FIG. 1. In a second-stage ATM switch SW2, input-side basic switches 6 constituting input line corresponding units 2-1 to 2-8 are removed from the block diagram shown in FIG. 1, and the input terminals of electro-optic converters 7-1 to 7-8 are connected to the output terminals of output-side basic switches 11 constituting output line corresponding units 4-1 to 4-8 of the first-stage ATM switch SW1. When the third and subsequent stages must be connected, the same arrangement as that of the second-stage ATM switch SW2 is sequentially connected. The detailed structures, functions, and operations of the respective components have been described in detail in the embodiment shown in FIG. 1, and a detailed description thereof will be omitted.

This arrangement can flexibly cope with a large-scale ATM switch, and the quantity of hardware can be largely reduced, as compared to the prior art. With such multiple arrangement, traffic localization can be solved without using any feedback circuit, unlike the above-described embodiments.

What is claimed is:

1. An ATM switch for distributing cells arriving from a plurality of input lines to a plurality of output lines, comprising:

a plurality of input line corresponding units each connected to said plurality of input lines;

a plurality of output line corresponding units each connected to said plurality of output lines; and wavelength shifting means, arranged between said input line corresponding units and said output line corresponding units, for shifting optical signals having different wavelengths included in a plurality of wavelength-multiplexed optical signals arriving from said input line corresponding units and outputting the wavelength-multiplexed optical signals, wherein each of said input line corresponding units includes an input-side basic switch for distributing N (N is a positive integer) cells which are respectively input to a plurality of input ports to N lines, electro-optic conversion means for converting the cells distributed to the N lines into optical signals having different wavelengths in units of lines, and a multiplexer for multiplexing the optical signals converted in units of lines into one wavelength-multiplexed optical signal, and each of said output line corresponding units includes a demultiplexer for demultiplexing in units of wavelengths the wavelength-multiplexed optical signal obtained by wavelength-multiplexing the optical signals having N wavelengths, opto-electric conversion means for converting outputs from said demultiplexer into electrical signals, respectively, and an output-side basic switch for distributing the cells converted into the electrical signals to a plurality of output ports.

2. A switch according to claim 1, wherein said wavelength shifting means is constituted by a barrel shifter which distributes an optical signal having a pth (p=0, 1, 2, ..., (N−1)) wavelength in an nth (n=0, 1, 2, ..., (the number of input line corresponding units −1)) wavelength-multiplexed optical signal to an (n+p)th output line and distributes the optical signal to an output of an ordinal number obtained by subtracting the number of output line corresponding units from (n+p) when n+p is not less than the number of output line corresponding units.

3. A switch according to claim 1, wherein at least some input terminals of said input line corresponding unit are connected to a circuit to which some signals processed by another input line corresponding unit are supplied.

4. A switch according to claim 1, wherein at least some input terminals of said input line corresponding unit are connected to a feedback circuit to which some signals processed by said output line corresponding unit are supplied.

5. A switch according to claim 1, wherein at least some of output ports constituting one output-side basic switch of said output line corresponding unit are connected to a feedback circuit connected to input ports of said input line corresponding unit corresponding to said one output-side basic switch.

6. A switch according to claim 1, wherein at least some of output ports constituting each input-side basic switch of each input line corresponding unit are connected to a feedback circuit connected to input ports constituting an input-side basic switch of another input line corresponding unit.

7. A switch according to claim 1, wherein all output terminals of at least one of said output line corresponding units are connected to all input terminals of a corresponding one of said input line corresponding units.

8. A switch according to claim 1, further comprising additional electro-optic conversion means converting input cells into optical signals having different wavelengths in units of inputs, and an additional multiplexer for multiplexing the optical signals converted in units of inputs, said additional multiplexer being connected to an input-side of said wavelength shifting means, and all output terminals of one of said output line corresponding units being connected to an input-side of said additional electro-optic conversion means.

9. A large-scale ATM switch comprising multiple-connected ATM switches, wherein an ATM switch at a first stage comprises a plurality of input line corresponding units each connected to a plurality of input lines, a plurality of output line corresponding units each connected to a plurality of output lines, and wavelength shifting means, arranged between said input line corresponding units and said output line corresponding units, for shifting optical signals having different wavelengths included in a plurality of wavelength-multiplexed optical signals arriving from said input line corresponding units and outputting the wavelength-multiplexed optical signals, each of said input line corresponding units including an input-side basic switch for distributing N (N is a positive integer) cells which are respectively input to a plurality of input ports to N lines, electro-optic conversion means for converting the cells distributed to the N lines into optical signals having different wavelengths in units of lines, and a multiplexer for multiplexing the optical signals converted in units of lines into one wavelength-multiplexed optical signal, and each of said output line corresponding units including a demultiplexer for demultiplexing in units of wavelengths the wavelength-multiplexed optical signal obtained by wavelength-multiplexing the optical signals having N wavelengths, opto-electric conversion means for converting outputs from said demultiplexer into electrical signals, respectively, and an output-side basic switch for distributing the cells converted into the electrical signals to a plurality of output ports, and each of ATM switches at subsequent stages comprises a plurality of input line corresponding units each connected to a plurality of input lines, a plurality of output line corresponding units each connected to a plurality of output lines, and wavelength shifting means, arranged between said input line corresponding units and said output line corresponding units, for shifting optical signals having different wavelengths included in a plurality of wavelength-multiplexed optical signals arriving from said input line corresponding units and outputting the wavelength-multiplexed optical signals, each of said input line corresponding units of each ATM switch at the subsequent stages including electro-optic conversion means for converting outputs from said output line corresponding units of said ATM switch at the previous stage into optical signals having different wavelengths in units of lines, and a multiplexer for multiplexing the optical signals converted in units of lines into one wavelength-multiplexed optical signal, and each of said output line corresponding units of each ATM switch at the subsequent stages including a demultiplexer for demultiplexing in units of wavelengths the wavelength-multiplexed optical signal obtained by wavelength-multiplexing the optical signals having N wavelengths, opto-electric conversion means for converting outputs from said demultiplexer into electrical signals, respectively, and an output-side basic switch for distributing cells converted into the electrical signals to a plurality of output ports.

* * * * *

UNITED STATES PATENT AND TRADEMARK OFFICE
CERTIFICATE OF CORRECTION

PATENT NO. : 5,892,604
DATED : April 6, 1999
INVENTOR(S) : Yamanaka et al.

It is certified that error appears in the above-identified patent and that said Letters Patent is hereby corrected as shown below:

In column 7, line 43, delete "optical path difference $\Delta L = 126$ µM" and insert -- optical path difference $\Delta L = 126$ µm --.

Signed and Sealed this

Fifth Day of December, 2000

Attest:

Attesting Officer

Q. TODD DICKINSON

Director of Patents and Trademarks